J. P. GROSVENOR.
Wheels for Vehicles.
No. 134,271. Patented Dec. 24, 1872.
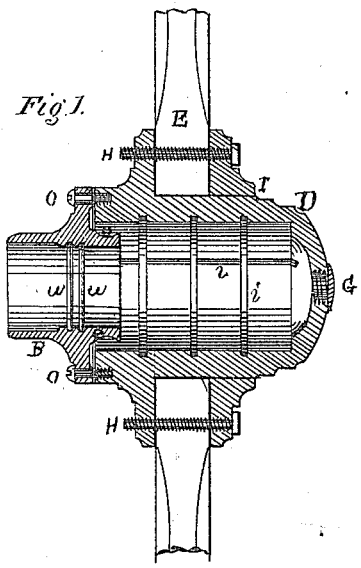
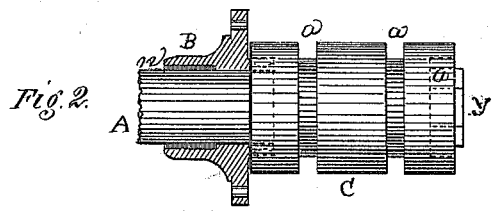
Witnesses:
R. D. Smith
C. Rogers
Inventor:
Jonathan P. Grosvenor

UNITED STATES PATENT OFFICE.

JONATHAN P. GROSVENOR, OF LOWELL, MASSACHUSETTS.

IMPROVEMENT IN WHEELS FOR VEHICLES.

Specification forming part of Letters Patent No. 134,271, dated December 24, 1872.

*To all whom it may concern:*

Be it known that I, JONATHAN P. GROSVENOR, of the city of Lowell, county of Middlesex and State of Massachusetts, have invented new and useful Improvements in Carriage-Wheels; and I do hereby declare that the following is a full, clear, and exact description thereof, reference being had to the accompanying drawing and to the letters of reference marked thereon making a part of this specification.

My invention has for its object to make or construct a carriage-wheel in such a manner as to make it strong, so that it shall possess the greatest degree of strength and at the same time be a self-lubricator. The nature of my invention consists in providing the axle where it passes through the hub with a boss, so that it will be larger than the shaft of the axle, in combination with the hub and a flange in connection therewith, the whole being of a novel and peculiar construction. It also consists in the combination of the hub, in connection with another flange, with the spokes and the before-mentioned boss.

To enable others skilled in the art to make and use my invention, I will proceed to describe its construction.

Figure I represents a longitudinal section of the hub and a view of the interior of the hub, showing the bearings of the axle and the oil-chambers, and the manner in which the spokes are secured in the hub. Fig. II represents a plan view of the boss; also, shows a section of the flange and axle.

Letters of like name and kind refer to like parts in each of the figures.

A represents an axle constructed after the plan of my invention. That portion of the axle having a bearing within the hub D is made larger, by means of a boss, than the shaft or axle-tree, so as to form what is known among mechanics as a boss. This said boss is fitted onto the axle and rigidly secured thereto by means of a screw-nut, G, a portion of which is only seen in the figure, except by dotted lines. *a a* represent grooves made upon the periphery of the boss C, which serve the purpose of oil-chambers. B shows a collar or flange which passes over the axle back of the boss C, and is secured to the hub D by means of screw-bolts *o o*, thus securing the wheel to the axle. The front and rear ends of this boss C are chambered out so as to form recesses for oil for the purpose of lubricating the ends of the boss when it has a bearing against the said flange or collar B and hub D. The inner portion or end of the flange B is made to project into the recess of the boss, the former being provided with an annular groove, *e*, which serves the purpose of conducting the oil to the bottom of the axle, from whence, by the motion of the wheel, it is again distributed throughout the whole bearing-surface of the axle and boss. The inner portion of the hub D is provided with oil-ducts *i i* extending both longitudinally and circumferentially upon the bearing-surface of the hub D, so that the oil has free access to every portion of the bearing-surface of the hub, boss, and axle.

It will be observed that the flange extends back from the hub over the axle-tree so as to form a stuffing-box, *n*, which I usually pack with rubber or other suitable material, for the purpose of keeping out the dust, and to prevent the same from entering within the wearing-surfaces of the hub and axle.

E represents the spokes, made to fit rigidly in a groove made in the periphery of the hub for receiving them. When the spokes for a wheel are all fitted and glued in position I secure them more fully by means of screw-bolts H H passing through the flange I, spokes, and opposite flange made upon the hub. The effect of the said bolts H H is to draw the flange I hard up against the tenons of the spokes, which supports and holds them rigidly in position. *w w* are ridges made on the inner side of the flange where it extends over the axle-tree, so as to aid in retaining the packing. At G is shown a screw-cap made in the front end of the hub, so that oil may be introduced into the bearings of the hub and axle. I represents a flange that is made to slide over a portion of the hub D, and forms a part thereof through which screw-bolts pass to secure the spokes, as above mentioned.

It will be observed that at the inner side of the outer end of the hub D is a square shoulder, which forms a perfect bearing for the ends of the boss C. It will also be seen that a shoulder is formed on the inside of the flange B, against which the other end of the boss has a bearing. These shoulders and the ends of the boss are made to fit in the most perfect manner, so as to prevent any lateral motion of the wheel upon the axle. It will be further observed that the boss, being of so much larger diameter than the axle where it enters the hub, forms a recess within the hub, into which all the oil dripping from the ends of the boss is received, and by the revolution of the wheel the oil is distributed upon the bearing-surface of the axle and hub, as before mentioned.

By this plan, after the oil-chambers have been once filled with oil, the carriage may be run for months without the necessity of refilling the oil-chambers.

I am aware that bosses in some instances have been used upon shafts, but not to form both circumferential and end bearings for the boss. The former I do not claim broadly; but What I do claim as new, and desire to secure by Letters Patent, is—

1. The axle A having a boss, C, in combination with the hub D, the latter being provided with the flange B, substantially as herein shown and described, and for the purposes set forth.

2. The hub D, in connection with flange I and spokes E, in combination with the boss C, substantially and for the purposes set forth.

JONATHAN P. GROSVENOR.

Witnesses:
 CHARLES ROGERS,
 T. C. CONNOLLY.